April 4, 1950 A. L. MATTE 2,502,971

CARRIER WAVE SIGNAL SYSTEM

Original Filed Oct. 20, 1942 2 Sheets-Sheet 1

INVENTOR
A. L. MATTE
BY
N. S. Ewing
ATTORNEY

April 4, 1950 A. L. MATTE 2,502,971

CARRIER WAVE SIGNAL SYSTEM

Original Filed Oct. 20, 1942 2 Sheets-Sheet 2

INVENTOR
A. L. MATTE
BY
N. D. Ewing
ATTORNEY

Patented Apr. 4, 1950

2,502,971

UNITED STATES PATENT OFFICE 2,502,971

CARRIER WAVE SIGNAL SYSTEM

Andrew L. Matte, Summit, N. J., assignor to Bell Telephone Laboratories, Incorporated, New York, N. Y., a corporation of New York Original application October 20, 1942, Serial No. 462,756. Divided and this application September 18, 1946, Serial No. 697,763

5 Claims. (Cl. 178—88)

Figure 1:
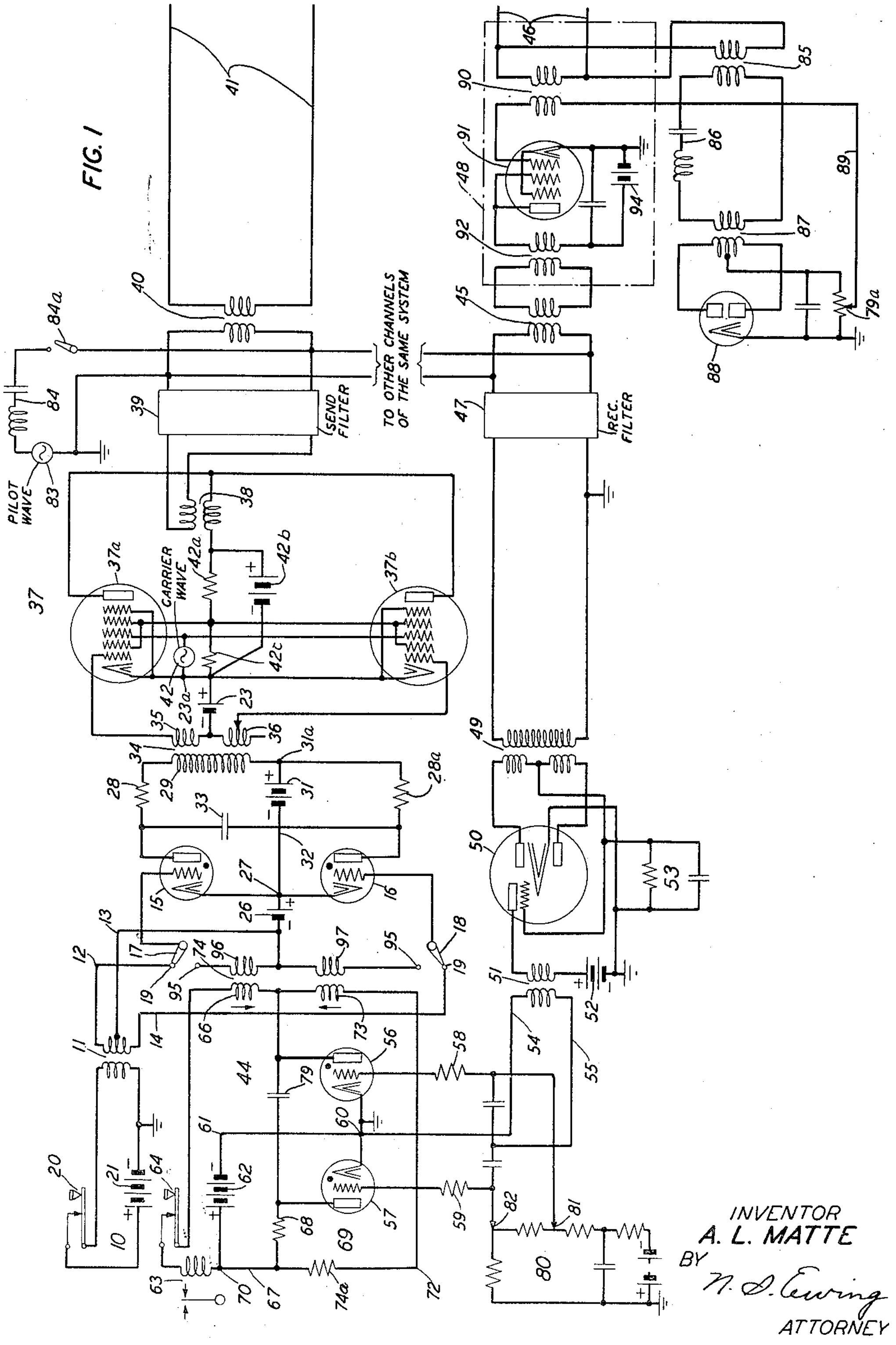

This invention relates to a signaling system, and particularly to a receiver for a system in which mark-to-space and space-to-mark transitions are individually transmitted as discrete alternating current impulses whose durations are constant and independent of the length of the respective marking and spacing intervals.

This application is a division of my copending application, Serial No. 462,756, filed October 20, 1942, now Patent 2,408,794, patented on October 8, 1946.

Telegraph codes usually consist of combinations of spaces and marks of such duration and order as to distinguish individual characters. In certain instances, such as in submarine telegraph codes, more than two conditions may sometimes be used, but in all cases the principle is substantially the same. In well-known types of telegraph systems utilizing such codes, it is the usual practice to transmit current for the entire duration of either the marking or spacing interval, and to suppress the current or reverse its polarity during the other interval. Once transmission is commenced however, complete intelligence is supplied by the timing of the intervals between transitions from space-to-mark and mark-to-space.

Impulse telegraph systems may be broadly divided into two types; firstly, those in which space-to-mark and mark-to-space transitions are generated at the sending end of the transmission circuit; and secondly, those in which such transitions are produced at the receiving end of the transmission circuit. In the usual type of alternating current systems in which the carrier current generated at the sending end is sustained on the line for the entire duration of marking or spacing transitions and suppressed during the converse operation, the average power obtaining on the line is relatively substantial. Similarly, in a system in which the marking or spacing transitions are produced at the receiving end, the amount of current sustained on the line constitutes a relatively large average. The present invention concerns a telegraph system arranged to transmit both marking and spacing transitions only for the time intervals required for the system to distinguish transitions, thereby utilizing substantially a minimum average amount of power to transmit a given amount of intelligence.

In multichannel signal systems where a plurality of discrete signal currents are amplified by the same line repeaters, the total amount of current on the line tends to approach the sum of the short time averages of the discrete signal currents when the number of channels is large. As this determines the power capacity of the line repeaters, the economy of the system as a whole is affected. In systems of the types known previously, the average amount of current is relatively high for the reasons that regulation and other purposes necessitate the transmission of current on the line during idle or marking periods. Consequently, there may exist relatively long time intervals where the majority of the telegraph circuits in such carrier systems will simultaneously transmit substantially their maximum values of current although no intelligence is being sent over the line. This condition may be particularly objectionable where both telegraph and telephone intelligence is transmitted on a common multichannel carrier circuit, such as a coaxial transmission line, for the reason that although the telegraph system may be transmitting no intelligence during the traffic peak intervals of the telephone system, the telegraph system would tend to impose its maximum demand on the power carrying capacity of the common carrier circuit. In other words, the telegraph system would be imposing substantially its maximum demand on the carrier circuit from a power carrying standpoint during periods when the telegraph system is transmitting no intelligence.

The present invention contemplates a telegraph system such that impulses of carrier current are transmitted on a line for timing purposes only, the duration of such impulses per se from a time standpoint being only sufficient to enable receiving apparatus to respond to and indicate the occurrence of transitions, and such that no carrier current is transmitted on the line at other times.

The main object of the invention is to transmit telegraph code signals in one channel of a multichannel carrier circuit such that substantially identical impulses of carrier current indicate only space-to-mark and mark-to-space transitions.

Another object is to employ substantially a minimum amount of electrical power in order to transmit a given amount of intelligence.

A further object is to eliminate all line current during intervals in which no intelligence is being transmitted.

Still another object is to obviate the necessity of maintaining current on the line during idle periods for level compensation purposes.

A still further object is to translate direct current signals of conventional type into transitional alternating current pulses.

Another object is to translate alternating current transitional pulses into conventional direct current signals.

In a specific embodiment, the present invention comprises sending and receiving loops operated by direct current and connected together by a line arranged to transmit alternating current. At the sending end, signals originate in the sending loop as periods of direct current flow corresponding to marks, and as periods of no current flow corresponding to spaces. The successive periods of current and no current in the sending loop are translated into pairs of direct current pulses of opposite polarity. The individual pulses are distinguished from each other on the basis of their polar characteristics by a pair of gaseous discharge devices and thereafter impressed successively on a modulator for translation into successively identical pulses of alternating current of certain frequency. At the receiving loop the successive alternating current pulses are rectified and then translated into successively identical steep wave front voltage pulses. These pulses are successively impressed on a pair of similarly poled gaseous discharge devices so arranged as to effect alternately in the receiving loop a period of direct current flow corresponding to a marking signal and a period of no current flow corresponding to a spacing signal. The corresponding marking and spacing signals occurring in both the sending and receiving loops are substantially identical in character.

A modification contemplates imparting distinctive magnitude characteristics to successive marking and spacing impulses of carrier current to avoid persistent inversion of the received signals which inversion might tend to result from the reception of an odd number of spurious carrier current pulses. In this modification, a pilot channel regulator located at the receiving terminal compensates for variations of line attenuation.

Figure 2:
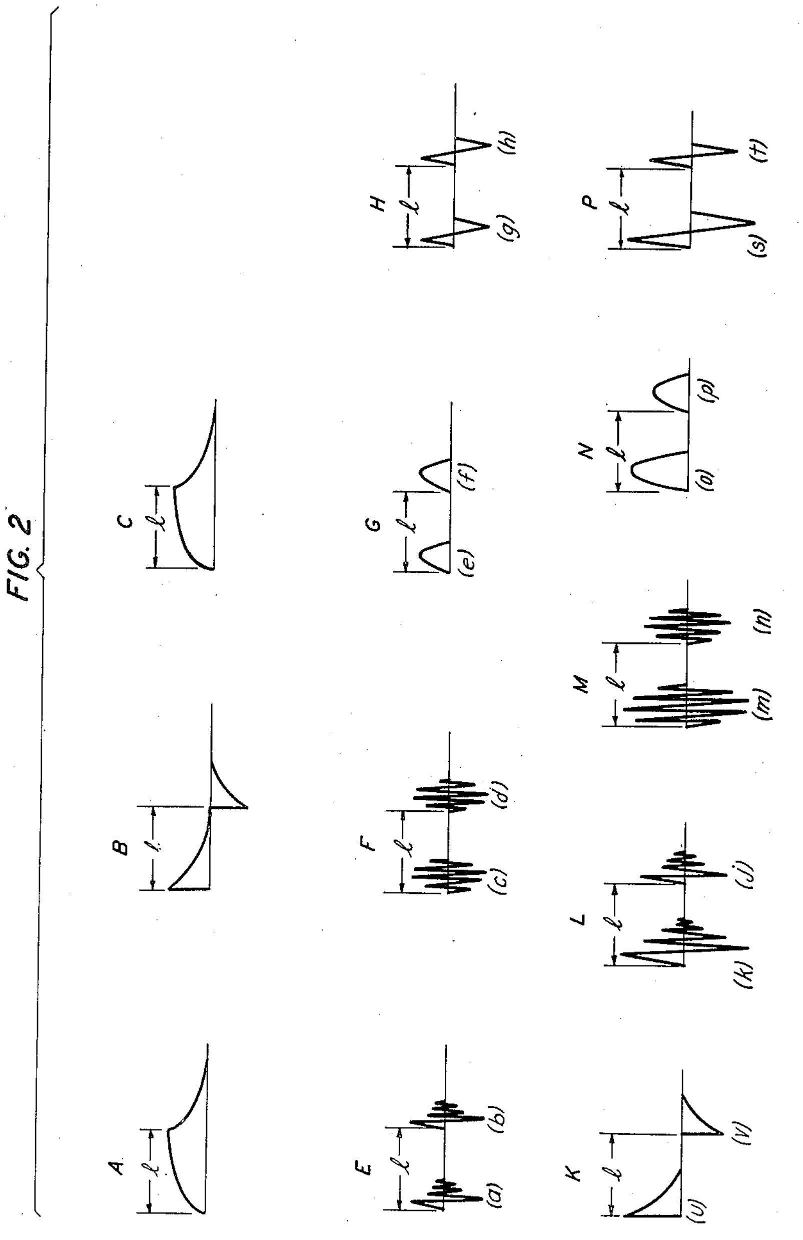

The invention will be readily understood from the following description taken together with the accompanying drawing in which:

Fig. 1 is a schematic circuit illustrating a specific embodiment of the invention, and Fig. 2 shows the action at certain points of Fig. 1.

Fig. 1 shows a combined sending and receiving terminal of an alternating current telegraph system arranged for full-duplex operation such that discrete impulses of alternating current are formed at the sending terminal of a transmission line and detected at a receiving terminal thereof. This system may be modified for half-duplex operation in a manner that will be hereinafter pointed out. It is to be understood that the arrangement of Fig. 1 is duplicated at the opposite end of the transmission line to provide a two-way carrier wave telegraph system.

Referring to Fig. 1, a sending loop 10 is applied through a pulse-forming transformer 11 and leads 12, 13 and 14 to the control grids of gaseous discharge tubes 15 and 16 arranged in push-pull relation. Included in the leads 12 and 14 are respective single pole switches 17 and 18 whose function will appear subsequently and which normally rest on a pair of outer contacts 19, 19. The sending loop 10 embodies in series a key 20, a grounded source 21 of direct current potential and the primary winding of the pulse-forming transformer 11.

The negative terminal of a source 26 of direct current potential, whose positive terminal is connected to a point 27 common to the cathodes of both tubes 15 and 16, is applied to the control grids of both thereof, through lead 13, secondary windings of the pulse-forming transformer 11, leads 12 and 14, terminals 19, 19 and switches 17 and 18. The anode circuit of tube 15 extends through anode resistance 28, primary winding 29 of transformer 34, source 31 of anode potential, lead 32, to the common point 27. The anode circuit of tube 16 is connected through anode resistance 28*a*, the positive terminal of the source 31, and lead 32 to common point 27.

The secondary windings 35 and 36 of the transformer 34 are respectively connected, via source 23 of direct potential, between the signal grids and cathodes of an electron discharge modulator 37 comprising pentagrid converter tubes 37*a* and 37*b* connected in push-pull relation. A source 42 of carrier current of certain frequency is connected between the common point 23*a* of the cathodes and the oscillator grids of both tubes 37*a* and 37*b* whose accelerating grids are connected together, and to a potentiometer arrangement consisting of serially connected resistances 42*a* and 42*c* bridged around direct current source 42*b* which supplies anode potential to both tubes 37*a* and 37*b*. The primary winding of input transformer 38 is serially connected in both anode circuits of the tubes 37*a* and 37*b*, while its secondary winding is applied to the input side of sending filter 39.

The tubes 37*a* and 37*b* and the carrier current source 42 serve to apply impulses of alternating current to the transmission line 41 under control of voltages present successively in the transformer 34 in a manner that will be hereinafter described. At all other times the source 23 serves to effectively bias the signal grids of the tubes 37*a* and 37*b* to suppress carrier current from the source 42.

Incoming transmission line 46 is applied to a channel receiving filter 47 through an input transformer 45 and a terminal regulating amplifier 48 whose function will be subsequently explained. The receiving filter 47 is applied to an input winding of a transformer 49 whose split output winding is connected to the diode portion of a diode rectifier-triode amplifier tube 50 of which the triode portion is impressed across the input winding of a transformer 51. A source 52 of direct potential is applied through the primary winding of the transformer 51 to the anode of the triode. An R-C network 53 serves to supply biasing potential to the control grid of the triode in the usual manner. The diode portion of the tube 50 is arranged for full wave rectification.

The output winding of the transformer 51 extends over leads 54 and 55 to the control grid-cathode circuits of gaseous discharge tubes 56 and 57 embodied in receiving loop 44 as will presently be explained, and whose control grids have connected in series therewith respective current limiting resistors 58 and 59. The anode circuit of the tube 57 embodies common cathode terminal 60, lead 61, source 62 of direct potential, point 70, lead 67, and resistance 68. The anode circuit of the tube 56 is completed through either of the following two paths: (1) common cathode terminal 60, lead 61, source 62 of direct potential, point 70, winding of sounder 63, key 64, winding 66 of transformer 74, the anode-cathode of the tube 56, and back to the common point 60; and (2) common cathode terminal 60, lead 61, source 62 of direct potential, point 70, lead 67, artificial line 74a, lead 72, winding 73 of transformer 74, the anode-cathode of the tube 56, and back to the common point 60. The function of the path (2), called the artificial line path, will be hereinafter pointed out. The windings 66 and 73 constitute the primary winding of a pulse-forming transformer 74 utilized for half-duplex operation in a manner that will be subsequently explained. A common source 80 of direct potential serves to bias the control grids of the tubes 56 and 57 through respective adjustable contacts 81 and 82. A capacitor 79 is applied across the anodes of both tubes 56 and 57.

Pilot wave regulation embodies at the sending terminal of the line 41 a source 83 of alternating current of suitable frequency and fixed voltage applied through a series tuned circuit 84 across the input winding of the line transformer 40. A single pole single throw switch 84a is connected in series with the tuned circuit 84 and the pilot source 83. At the receiving terminal of the line 46, the received pilot wave is applied through transformer 85, series tuned circuit 86 and transformer 87 to a diode rectifier 88 arranged for full wave rectification. The rectified pilot voltage is impressed over lead 89 and secondary winding of line transformer 90 to the control grid of a variable mu thermionic amplifier 91 whose output is impressed through transformer 92 onto the input winding of the transformer 45. A source 94 of direct potential is applied through the input winding of the transformer 92 to the anode of the amplifier 91.

The operation of Fig. 1 will now be explained in the following order: firstly, full-duplex with successive carrier current impulses having substantially identical magnitudes of envelopes; secondly, half-duplex with successive carrier current impulses having substantially identical magnitudes of envelopes; thirdly, full-duplex with successive carrier current impulses having different magnitudes of envelopes; and fourthly, half-duplex with successive carrier current impulses having different magnitudes of envelopes.

In the operation of Fig. 1 arranged to produce and utilize a series of discrete carrier current impulses such that successive carrier current impulses have substantially uniform or identical magnitudes of envelopes, it is to be understood that the two secondary windings 35 and 36 of the transformer 34 embody the same number of turns; that the contacts 81 and 82 of the biasing source 80 at the receiving terminal are so adjusted that the same magnitude of biasing voltage is simultaneously impressed on the control grids of both tubes 56 and 57; and that the sending key 64 of the receiving loop 44 is in a closed position. When the sending key 20 is in the closed position, direct current flows steadily in the sending loop 10, and therefore through the primary winding of the pulse-forming transformer 11. This will be assumed to be a marking condition. When the sending key 20 is in the open position, such direct current decays to zero. This will be assumed to be a spacing condition.

For the purpose of this explanation, it is assumed that the sending key 20 has been open for a period sufficiently long that a steady state prevails in the system. This means that, as a consequence of a previous operation, gaseous tubes 16 and 57 are ionized; gaseous tubes 15 and 56 are deionized; and the voltages across the secondary windings 35 and 36 of the transformer 34 are substantially zero. Further, this means that the modulator 37 does not apply impulses of carrier current to the line 41, as the biasing source 23 nullifies the effect of the carrier source 42 on the tubes 37a and 37b.

The building up and decay of direct current from the source 21 in the sending loop 10 through the primary winding of the transformer 11 for the respective marking and spacing signals is illustrated in Fig. 2A. As is well known, a rising primary current causes the induction of a voltage in the secondary winding of the transformer 11 in one direction such that as the primary current reaches its steady state value the voltage in the secondary winding will have attained its maximum and then fallen to zero; and a falling primary current causes the induction of a voltage in the secondary winding of the transformer 11 in the opposite direction such that as the primary current reaches its steady state value the voltage in the secondary winding will have attained its maximum value and then fallen to zero. The voltage in the output winding of the transformer 11 will then be a series of a sharp pulses of alternately opposite polarity, one pulse at the start of each of the marking and spacing signals. Thus, the positive and negative voltage pulses for the respective marking or spacing signals in the sending loop 10 are illustrated in Fig. 2B. Accordingly, the positive and negative voltage pulses applied to the respective control grids of the gaseous tubes 15 and 16 to control ionization therein in the well-known manner are represented as the steep front pulses in Fig. 2B.

As the gaseous tube 15 is assumed to be deionized, the application of the voltage pulse of positive polarity, Fig. 2B, to the control grid of the tube 15 in response to a marking actuation of the sending key 20 will institute ionization therein in the well-known manner. As the anode circuits of gaseous tubes 15 and 16 include individual resistors 28 and 28a respectively, and as the anodes of both latter tubes are directly connected by the capacitor 33, the starting of ionization in the tube 15 causes a drop momentarily in the effective anode voltage applied to the gaseous tube 16 below a value at which ionization can be maintained. Hence, ionization in the gaseous tube 16 is quenched. The application of the voltage pulse of negative polarity, Fig. 2B, in the control grid circuit of the gaseous tube 16, in response to a spacing actuation of the sending key 20 will institute ionization in the latter tube in the well-known manner. Here again the capacitor 33 and resistors 28 and 28a serve to reduce momentarily the effective anode voltage applied to the tube 15 below a value at which ionization therein can be maintained. Hence, ionization in the tube 15 is quenched. Thus the marking and spacing voltage pulses of opposite polarities, Fig. 2B, are effectively separated and serve to institute alternate ionization in the tubes 15 and 16 to produce a flow of current alternately in the anode circuits of the tubes 15 and 16 such that each anode current possesses the wave configuration illustrated in Fig. 2C. Consequently, these anode currents are substantially identical in wave pattern in their respective circuits for both marking and spacing actuations of the sending key 20, but flow in opposite directions with respect to junction point 31a of these latter circuits.

Ignition and extinction of ionization in the tube 15 cause a flow of the anode current, Fig. 2C, in the winding 29 of the transformer 34. This serves to induce voltages in each of the windings 35 and 36 coupled to the winding 29. This is achieved in the manner pointed out above in connection with the corresponding action in the loop transformer 11. Consequently, the effective voltages applied to the signal grid-cathode circuits of the modulator tubes 37a and 37b and due to each of the respective marking and spacing actuations of the sending key 20 will have the wave shapes shown in Fig. 2B. As the windings 35 and 36 embody the same number of turns, the magnitude of the successive individual voltage pulses, Fig. 2B, will be substantially equal.

Due to the push-pull connection of the modulator tubes 37a and 37b, the positive impulse of the voltage cycle, Fig. 2B, serves to render the signal grid of the modulator tube 37a momentarily positive. This institutes a flow of space current in the output circuit of the latter tube whereby the carrier source 42 is enabled to transmit to the primary winding of its output transformer 38 an impulse of carrier current having the envelope shown as impulse (a) in Fig. 2E. The positive impulse of the voltage cycle, Fig. 2B, is also applied at the same time to the signal grid of the modulator tube 37b and has no effect on the operation thereof except to drive its signal grid more negative momentarily. Conversely, the negative impulse of the voltage cycle, Fig. 2B, has no effect on the operation of the modulator tube 37a, except to drive its signal grid more negative momentarily, while at the same time this negative impulse renders the signal grid of the modulator tube 37b positive momentarily. This institutes a flow of space current in the output circuit of the latter tube whereby the carrier source 42 is enabled to transmit to the primary winding of the output transformer 38 an impulse of carrier current having the envelope illustrated as impulse (b) in Fig. 2E. Thus, the modulator 37 serves to convert the two voltage impulses of opposite polarity, Fig. 2B, into the two carrier current impulses (a) and (b), Fig. 2E, which impulses are provided substantially with equal envelopes for the reason that the effects of the positive and negative impulses, Fig. 2B, on the modulator 37 are substantially the same. Thus, in Fig. 2E, the impulse (a) corresponds to the space-to-mark transition while the impulse (b) corresponds to the mark-to-space transition. The sending channel filter 39 rounds off the impulses of carrier current, 2E, to form the carrier current impulses 2F which are transmitted to the line transformer 40 such that the impulses (c) and (d), Fig. 2F, correspond to the impulses (a) and (b), Fig. 2E, respectively.

At the receiving terminal the received impulses (c) and (d), Fig. 2F, are applied directly to the receiving transformer 45, thence successively to the channel filter 47, transformer 49, and the rectifier-amplifier 50. The regulating amplifier 48 and associated circuits are not involved in the mode of operation discussed at this point. In the output of the amplifier-rectifier 50, the amplified rectified marking and spacing carrier impulses appear as substantially identical space-to-mark and mark-to-space rectified impulses (e) and (f) respectively, Fig. 2G. The space-to-mark and mark-to-space rectified impulses (e) and (f), Fig. 2G, are impressed through the transformer 51 onto the control grids of the gaseous tubes 56 and 57. At this point the space-to-mark and the mark-to-space impulses appear as the respectively identical impulses (g) and (h), Fig. 2H. Each of the latter impulses is impressed in turn on the control grids of both tubes 56 and 57 at the same time. Whichever tube has ionization quenched, that tube will then have ionization instituted therein as the threshold bias provided by the source 80 is counteracted by the impulse (g) or (h), Fig. 2H, by at least a certain minimum amount. Due to the combined action of condenser 79, resistance 68, and the effective resistance of the receiving loop 44, the institution of ionization in one of the tubes 56 and 57 serves to quench forthwith ionization in the other of these tubes. As the tubes 56 and 57 are not arranged in the push-pull relation, the negative loops of both the impulses (g) and (h), Fig. 2H, in nowise affect the ionization or deionization of either of these tubes, such action being influenced exclusively by the steep fronts of the positive portions of impulses (g) and (h), Fig. 2H.

As the tube 56 is assumed to be deionized, and the tube 57 to be ionized, the space-to-mark impulse (g), Fig. 2H, impressed on the control grid of both tubes 56 and 57 at the same time serves to institute ionization in the tube 56 whereupon ionization is quenched in the tube 57 in the usual manner. One portion of anode current of the tube 56, therefore, flows in a circuit extending from positive terminal of source 62, branch point 70, winding of receiving sounder 63, key 64, winding 66 of transformer 74, anode-cathode of tube 56, common terminal 60 and lead 61 to the negative terminal of the source 62. From the branch point 70 another and equal portion of anode current of the tube 56 flows in a circuit including lead 67, artificial line 74a, lead 72, winding 73 of the transformer 74, anode-cathode circuit of the tube 56, common point 60, lead 61, source 62 and back to the branch point 70. This flow of current serves to actuate the receiving sounder 63 to a marking position to repeat the initial marking condition previously established in the sending loop key 20.

The mark-to-space impulse (h), Fig. 2H, next impressed on the control grids of both tubes 56 and 57 at the same time serves to institute ionization in the tube 57, whereupon ionization is quenched in the tube 56, so that anode current flows in a circuit comprising positive terminal of source 62, branch point 70, lead 67, resistor 68, anode-cathode circuit of tube 57, common terminal 60, lead 61 and negative terminal of the source 62. As the extinction of ionization in the tube 56 interrupts the flow of energizing current for the receiving sounder 63 in the previously traced receiving loop 44, such current interruption will cause the sounder 63 to be actuated in the well-known manner to a spacing position to repeat the initial spacing condition previously established in the sending loop key 20. Hence, the building up and decay of energizing current in the receiving loop 44 is illustrated in Fig. 2A.

Thus the marking and spacing signals effected by the sending key 20 in the sending loop 10 and comprising sustained variable periods of direct current flow interspersed with equally variable periods of no flow of direct current are subsequently established as substantially identical direct current signals in the receiving loop 44. Accordingly, both the initial and final signals are illustrated in Fig. 2A.

While the foregoing is based on closed and open periods of the sending loop 10, it is evident that polar signals would accomplish substantially the identical sequence of action.

For the operation of Fig. 1 on half-duplex such that successive space-to-mark and mark-to-space impulses are provided with substantially uniform or identical magnitudes of envelopes, the switches 17 and 18 are initially actuated to both inner contacts 95, 95. It will be understood that at the opposite terminals of the lines 41 and 46, not shown, is located equipment identical with that shown in Fig. 1, and further that corresponding switches 17 and 18 thereat are likewise operated to corresponding inner contacts 95, 95. This switching operation effectively disconnects the sending loop 10 from the line 41, and simultaneously therewith effectively conditions the loop 44 for both the transmitting of signals to the line 41 and the receiving of signals from the line 46 such that the received signals are isolated from the line 41.

Such isolation is occasioned by the fact, as previously pointed out, that when a mark-to-space impulse is received from the line 46, the ionization of tube 56 is quenched so that no space current flows in either winding 66 or 73; whereas, when a space-to-mark impulse is received from the line 46 ionization is instituted in the tube 56 and equal amounts of space current are caused to flow in opposite directions in the windings 66 and 73 as indicated by the arrows. Equalization of these space currents may be attained by suitable adjustment of the resistive characteristic of the artificial line 74*a*. Therefore, it is clear that during both the conditions of deionization and ionization of the tube 56 no voltage is produced in either of the secondary windings 96 or 97 of the transformer 74.

Half-duplex sending is initiated by operating the key 64 to the closed position to transmit to the line 41 a space-to-mark impulse. During such operation, however, it is to be understood that the corresponding key located at the receiving terminal of the line 41, not shown, is in the closed condition so that the corresponding tubes 56 and 57 thereat are in the ionized and deionized conditions respectively. Next, the key 64 is operated to the open position to transmit to the line 41 a mark-to-space impulse. Such operations of the key 64 achieve precisely the same sequence of operations as that hereinbefore explained in connection with the corresponding operations of the key 20 in the case of full-duplex operation, whereby impulses of carrier current, Figs. 2E and 2F, are caused to be transmitted to the line 41.

Thus, primary winding 66 of transformer 74 corresponds to the primary winding of the transformer 11, while secondary windings 96 and 97 are connected to the gaseous discharge tubes 15 and 16 in exactly the same electrical relation with respect to the primary winding 66 as the secondary winding of the transformer 11 bore formerly to the primary winding of the latter transformer in the case of full-duplex operation. Tube 56 is held in the ionized condition when the key 64 is in the open position by the fact that a voltage is applied to the anode of the tube 56 over a path comprising positive terminal of source 62, branch point 70, artificial line 74*a*, lead 72, primary winding 73, anode-cathode of tube 56, common terminal 60 and lead 61 to the negative terminal of the source 62. As the amount of space current flowing in the next previously traced circuit is substantially constant, as distinguished from the gradual build-up and decay of space current in the primary winding 66, no voltage is induced in the associated secondary windings 96 and 97. As a consequence there is no voltage to effect the production of impulses of carrier current from the carrier source 42 in the manner explained above.

If the distant operator wishes to "break," he actuates his key 64 to the open position. This effectively transmits a mark-to-space impulse over the line 46 whereby, in Fig. 1, ionization is instituted in the tube 57 and ionization in the tube 56 is quenched. This effectively opens the loop 44 in Fig. 1 thereby rendering the operation of key 64 in Fig. 1 further ineffective to transmit signals. Such condition of the loop 44 in Fig. 1 is instantly recognized by the operator of the key 64 in Fig. 1 by reason of the non-responsiveness of his sounder 63 in Fig. 1.

In the operation of Fig. 1 on the basis of full-duplex with successive space-to-mark and mark-to-space impulses having different magnitudes of envelopes, it is to be understood that initially the number of turns of the secondary winding 36 of the transformer 34 is so adjusted as to effect a predetermined difference between the magnitude of the voltage produced by this winding with reference to the magnitude of the voltage produced by the secondary winding 35 of the transformer 34; and further that the movable terminals 81 and 82 of the biasing source 80 are so adjusted as to apply predetermined different amounts of biasing voltage to the control grids of the receiving tubes 56 and 57 so as to be commensurate with the magnitudes of the voltages applied to the signal grids of the tubes 37*a* and 37*b* embodied in the impulse modulator 37 for reasons that will presently appear.

The performance of the transmitting end of the system of Fig. 1 including the operations of the key 20 and the successive ionization of the gaseous discharge tubes 15 and 16 due to the space-to-mark and mark-to-space transitions is identical with that previously explained for the full-duplex operation of Fig. 1 in the case where the successive carrier impulses possess substantially identical magnitudes of envelopes; and therefore the wave shape of the space current flowing in the primary winding 29 of the transformer 34 is illustrated in Fig. 2C. However, as the number of turns of the secondary winding 35 is assumed to be larger than the number of turns of the secondary winding 36, the space-to-mark transitions which initiate the ionization of tube 15 and the mark-to-space transitions, which cause the ionization of the tube 16, are converted into the different relative magnitudes of voltage impulses illustrated in Fig. 2K. Hence, in Fig. 2K, the impulse (*u*) is effected by the secondary winding 35 while the impulse (*v*) is effected by the secondary winding 36.

As in the case of duplex operation described above, the voltage impulses (*u*) and (*v*), Fig. 2K, cause the modulator tubes 37*a* and 37*b* respectively, to draw space current alternately whereby the carrier source 42 is enabled to supply the respective carrier current impulses (*k*) and (*j*), Fig. 2L, to the output winding of the transformer 38. In this connection it will be noted that the larger positive impulse, Fig. 2K, enables the tube 37*a* to transmit the larger carrier current impulse (*k*), Fig. 2L, while the smaller negative impulse, Fig. 2K, enables the tube 37*b* to transmit the smaller carrier current impulse (*j*), Fig. 2L. The carrier current impulses (*k*) and (*j*), Fig. 2L, appear as the impulses (*m*) and (*n*), Fig. 2M, respectively, on the line 41 which impulses possess different relative magnitudes of envelopes.

The carrier current impulses (*m*) and (*n*), Fig. 2M, are received over the line 46 and successively applied to the rectifier-amplifier 50 which effects in the input winding of the transformer 51 the corresponding unidirectional impulses (*o*) and (*p*), Fig. 2N. In the output winding of the transformer 51, the two unidirectional impulses (*o*) and (*p*), Fig. 2N, assume the respective configurations (*s*) and (*t*), Fig. 2P, and are impressed alternately and successively on the control grids of both tubes 56 and 57 at the same time. As the biasing voltage applied to the control grid of the tube 56 is larger than that impressed on the control grid of the tube 57 as previously pointed out, only the impulse (*s*), Fig. 2P, is capable of instituting ionization in the tube 56, the impulse (*t*), Fig. 2P, being inadequate for this purpose. It is to be noted that the impulse (*s*), Fig. 2P, is also sufficient to institute ionization at the same time in the tube 57, but as the latter tube is already ionized due to a previously received mark-to-space transitional impulse (assumed), the effect of the impulse (*s*), Fig. 2P, on the tube 57 is nil. The receiving tubes 56 and 57 are, therefore, actuated to cause the sounder 63 embodied in the loop 44 to reproduce the marking and spacing signals of the sending key 20 in the manner hereinbefore described in connection with the full-duplex operation of Fig. 1.

In the operation of Fig. 1 on half-duplex with successive carrier current impulses provided with magnitude discrimination, the aforementioned adjustment of the relative number of turns of the secondary windings 35 and 36 of the transformer 34, and the different magnitudes of biasing voltage impressed on the control grids of the receiving tubes 56 and 57 are maintained identical with the above-mentioned operation of Fig. 1 on full-duplex with magnitude discrimination. The operation of Fig. 1 on half-duplex with magnitude discrimination is the same as the previously described operation of Fig. 1 on half-duplex, except in the former operation the successive carrier current impulses are provided with different magnitudes of envelopes. For the purpose of this illustration, the space-to-mark impulses are provided with the larger envelopes and the mark-to-space impulses with the smaller envelopes. Therefore, the receiving terminal in Fig. 1 is arranged to discriminate between the carrier current impulses of different magnitudes of envelopes exactly in the manner set forth hereinbefore in connection with the full-duplex operation of Fig. 1 with magnitude discrimination as illustrated in Figs. 2K, 2L, 2M, 2N and 2P.

The carrier current impulses of different magnitudes of envelopes, Fig. 2M, prevent permanent turnover between spacing and marking functions of Fig. 1 when the turnover is occasioned by receiving an odd number of false impulses due to interference in a manner that will be presently explained. According to the above explanation, the institution of ionization in the sending tube 15 results in the institution of ionization in the receiving tube 56 while institution of ionization in the sending tube 16 results in the institution of ionization in the receiving tube 57. If tube 57 is accidently ionized while the tube 15 is also ionized, or if the tube 56 is ionized while the tube 16 is ionized, it is obvious that incorrect signals will occur in the sounder 63. However, the magnitude discrimination between the space-to-mark and mark-to-space impulses, Fig. 2M, prevents error beyond a single transition for the following reason:

Let

V=the larger voltage magnitude to ionize tube 56.

v=the smaller voltage magnitude to ionize tube 57.

| Case No. | Magnitude of False Pulse | Tube Ionized | | Result |
|---|---|---|---|---|
| | | Before Interference | After Interference | |
| 1 | Less than v | Either | No change | No effect. |
| 2 | Greater than v, less than V. | 57 | 57 | Do. |
| 3 | do | 56 | 57 | Error. |
| 4 | Greater than V | 56 | 57 | Do. |
| 5 | do | 57 | 56 | Do. |

In the last three cases, the effect of the next legitimate pulse is as follows:

| Case No. | Magnitude of Next Pulse | Tube Ionized | | | Result. |
|---|---|---|---|---|---|
| | | Before Pulse Arrives | After Pulse Arrives | | |
| | | | Actual | Desired | |
| 6 | Smaller | 56 | 57 | 57 | Sequence restored. |
| 7 | do | 57 | 57 | 57 | Do. |
| 8 | Larger | 56 | 57 | 56 | Error. |
| 9 | do | 57 | 56 | 56 | Sequence restored. |

In case 8, the transition is incorrectly received, but since the next signal is perforce of the smaller magnitude, it finds tube 57, which it should ionize, already in that condition, and since its magnitude is insufficient to ionize 56 the normal sequence is restored forthwith.

In the operation of Fig. 1 with magnitude discrimination as above explained, pilot wave regulation provides the space-to-mark and mark-to-space impulses arriving at the primary winding of the receiving transformer 45 with substantially the same relative magnitudes of envelopes that these impulses had when they were applied to the sending terminal of the line 41. Such regulation prevents the mark-to-space impulse of the lesser magnitude of envelope, Fig. 2M, from instituting ionization in the tube 56 when the attentuation of line 41 is relatively low; or the space-to-mark impulse of the greater envelope, Fig. 2M, from failing to institute ionization in the tube 56 when the attentuation of line 41 is relatively high; such regulation also has the further advantage of minimizing the effects of interference on line 41 or 46.

In the operation of the specific pilot wave regulator illustrated herein, a pilot alternating current wave of suitable frequency provided by the source 83 is applied through the series tuned circuit 84 and line transformer 40 to the sending end of the line 41. At the receiving end of the line 46, this pilot wave is rectified in the rectifier 88 and the rectified voltage across the resistor 79 is utilized to control the gain of the variable mu amplifier 91. As the pilot wave undergoes the same line attenuation as the transmitted space-to-mark and mark-to-space impulses, the receiving terminal amplifier 48 serves to maintain the envelopes of these impulses substantially at desired relative magnitudes as illustrated in Fig. 2M. The switch 84a may be utilized to disconnect the pilot source 83 from the line 41 during intervals when no intelligence is being transmitted.

In the above-explained operations of Fig. 1 on the basis of both full-duplex and half-duplex, both with and without magnitude discrimination, the successive impulses of carrier current are transmitted on the line for timing purposes only, the durations of such impulses being, from a time standpoint, only sufficient to allow the receiving apparatus to respond to and indicate the occurences of transitions. Hence, carrier current is utilized only for the purpose of transmitting intelligence, and is disconnected from the line during other periods. In the latter periods, it is obviously unnecessary to transmit pilot current for regulation purposes; and therefore pilot current may also be utilized only during intervals when carrier current is being utilized to transmit intelligence and may be disconnected from the line during other periods.

Although the invention has been illustrated in connection with the use of metallic lines and a manually operated sending key, it is obvious that the invention may be expeditiously utilized in radio signaling systems as well as telegraph printers to produce marking and spacing impulses in systems involving metallic lines or radio systems. Further, it is to be understood that individual carrier current impulses can be interchanged to represent either mark-to-space or space-to-mark transitions without affecting the performance of the system.

What is claimed is:

1. An alternating current receiving signal system comprising a line transmitting impulses of alternating current having predetermined relative magnitudes for representing space-to-mark and mark-to-space transitions, each impulse representing one transition, said line transmitting no impulses when said transitions are withheld therefrom, a telegraph instrument, and means for connecting said line and instrument in circuit whereby said instrument is operated to repeat the transitions represented by the carrier impulses on said circuit line, said circuit means comprising means for translating the impulses received from said line into sharply peaked pulses having at least a certain polarity and predetermined relative magnitudes, and two ionizable devices, said circuit means being adapted to ionize and deionize said devices alternately in response to sharply peaked pulses of said certain polarity for controlling the flow of current in said instrument, said circuit means being arranged to maintain one device in the deionized state and the second device in the ionized state when said transitions are withheld from said line whereby no current is caused to flow in said instrument, said circuit means being activated by a sharply peaked pulse of said certain polarity and predetermined magnitude to ionize said one device and to deionize said second device to institute a flow of direct current in said instrument whereby said instrument is operated to repeat the transition represented by the alternating current impulse translated into said last-mentioned pulse, and said circuit means being further activated by the next succeeding sharply peaked pulse of said certain polarity and predetermined magnitude to ionize said second device and to deionize said one device to interrupt the flow of current in said instrument whereby said instrument is operated to repeat the transition represented by the alternating current impulse translated into said last-mentioned pulse.

2. A signal system according to claim 1 in which said line transmits alternating current impulses having substantially equal magnitudes, said translating means translates the impulses received from line into sharply peaked pulses having at least said certain polarity and substantialy equal magnitudes, said circuit means is arranged to bias both said devices to the same extent, and said circuit means is so activated by sharply peaked pulses having said certain polarity and substantially equal magnitudes as to overcome the biases on said one and second devices to institute and terminate the ionization therein.

3. A signal system according to claim 1 in which said line transmits alternating current impulses having successively different magnitudes, said translating means translates the impulses received from said line into sharply peaked pulses having at least said certain polarity and successively different magnitudes, each of said ionizable devices includes a control grid, said circuit means is further adapted to bias the control grids of said devices to different amounts in such manner that said one device has its control grid biased to the larger amount, and said circuit means is activated by sharply peaked pulses having said certain polarity and successively different magnitudes to overcome the biases on the control grids of said one and second devices and thereby to ionize and deionize said one and second devices in such manner that said one device is ionized and said second device is deionized by the sharply peaked pulses having said certain polarity and the larger magnitude and further in such manner that said second device is ionized and said one device is deionized by the sharply peaked pulses having said certain polarity and the smaller magnitude.

4. A receiver for a carrier current telegraph signaling system comprising a transmission line for transmitting impulses of carrier current to identify signal transitions from space-to-mark and mark-to-space, said line transmitting no carrier current impulses when intelligence is being withheld therefrom, means for translating the carrier current impulses received on said line into relatively sharply peaked impulses of at least positive polarity, a telegraph instrument having an operating winding, a pair of gaseous discharge devices each including a cathode, a control grid and an anode, and means for connecting the anode and cathode of one of said devices, when ionized, in a series circuit with said operating winding and for connecting the anode and cathode of the second of said devices, when ionized, in short-circuit relation to said operating winding, said circuit means being adapted to bias the control grids of said devices to maintain said one device in the deionized state and said second device in the ionized state when intelligence is being withheld from said line whereby no current is caused to flow in said operating winding, said circuit means being adapted to alternately ionize said devices in response to sharply peaked pulses of said positive polarity only, said circuit means being adapted to apply to the control grids of both said devices the sharply peaked pulse of positive polarity due to a carrier impulse received from said line to overcome the bias on the control grid of said one device to cause said one device to ionize and said second device to deionize, said one device in the ionized state and said second device in the deionized state connecting the anode and cathode of said one device in series relation to said operating winding to institute a flow of current therein whereby said instrument is actuated to reproduce the transition represented by the last-mentioned carrier impulse, said circuit means being adapted to apply to the control grids of both said devices the sharply peaked pulse of positive polarity due to the next succeeding carrier impulse received from said line to overcome the bias on the control grid of said second device to cause said second device to ionize and said one device to deionize, said second device in the ionized state and said one device in the deionized state connecting the anode and cathode of said second device in short-circuit relation to said operating winding to interrupt the flow of current therein whereby said instrument is actuated to reproduce the transition represented by said last-mentioned carrier impulse.

5. A receiver for a carrier current telegraph signaling system comprising a line for transmitting carrier current impulses having successively different amplitudes to represent signaling transitions from space-to-mark and mark-to-space, said line transmitting no carrier current impulses during idle periods, means for translating the carrier current impulses received on said line into sharply peaked pulses having at least positive polarity and successively different amplitudes, a pair of gaseous discharge devices each including a control grid, a cathode and an anode, means for applying different amounts of bias to said control grids in such manner that the control grid of said one device has the larger bias applied thereto, a telegraph reproducer, and means for connecting said line, translating means, devices and reproducer in circuit, said circuit means being adapted to connect said cathode and anode of one device in series relation to said reproducer when said one device is ionized to institute a flow of current in said reproducer, said circuit means being adapted to connect said cathode and anode of the second device in a short-circuit relation to said reproducer when said second device is ionized to interrupt the flow of current in said reproducer, said circuit means being arranged with said biasing means to maintain said one device in the deionized state and said second device in the ionized state when intelligence is being withheld from said line, said circuit means being adapted to ionize and deionize said devices alternately in response to sharply peaked pulses of positive polarity only, said circuit means applying the sharply peaked pulses of positive polarity to the control grids of said devices due to the carrier current impulses received on said line until the sharply peaked positive pulse of the larger amplitude overcomes the larger bias on the control grid of said one device whereby said one device is ionized and said second device is deionized, said one device in the ionized state connecting its anode and cathode in series relation to said reproducer to institute a flow of current therein thereby causing said reproducer to repeat the transition represented by the carrier current impulse translated into said last-mentioned sharply peaked positive pulse of the larger amplitude, said circuit means also applying the sharply peaked pulses to the control grids of said devices due to the carrier current impulses received on said line until the next succeeding sharply peaked positive pulse overcomes the bias on the control grid of said second device whereby said second device is ionized and said one device is deionized, said second device in the ionized state connecting its anode and cathode in short-circuit relation to said reproducer to terminate the flow of current therein thereby causing said reproducer to repeat the transition represented by the carrier current impulse translated into said last-mentioned sharply peaked positive pulse.

ANDREW L. MATTE.

REFERENCES CITED

The following references are of record in the file of this patent:

UNITED STATES PATENTS

| Number | Name | Date |
| --- | --- | --- |
| 1,936,947 | Morganstern | Nov. 28, 1933 |
| 2,012,837 | Tear | Aug. 27, 1935 |
| 2,266,401 | Reeves | Dec. 16, 1941 |
| 2,444,429 | Cleeton | July 6, 1948 |